(12) United States Patent
Chiang et al.

(10) Patent No.: US 8,770,262 B2
(45) Date of Patent: Jul. 8, 2014

(54) STAINLESS STEEL-AND-AMORPHOUS ALLOY COMPOSITE AND METHOD FOR MANUFACTURING

(75) Inventors: Huann-Wu Chiang, New Taipei (TW); Cheng-Shi Chen, New Taipei (TW); Shun-Mao Lin, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 231 days.

(21) Appl. No.: 13/282,246

(22) Filed: Oct. 26, 2011

(65) Prior Publication Data

US 2013/0040163 A1 Feb. 14, 2013

(30) Foreign Application Priority Data

Aug. 11, 2011 (CN) .......................... 2011 1 0229894

(51) Int. Cl.
*B22D 19/04* (2006.01)
*B22D 19/00* (2006.01)
*B32B 15/01* (2006.01)

(52) U.S. Cl.
CPC ................ *B22D 19/04* (2013.01); *B22D 19/00* (2013.01); *B32B 15/013* (2013.01)
USPC ................................ 164/91; 164/75; 164/113

(58) Field of Classification Search
CPC ........ B22D 19/00; B22D 19/04; B22D 25/06; B32B 15/013
USPC .............................................. 164/75, 91, 113
See application file for complete search history.

(56) References Cited

U.S. PATENT DOCUMENTS

| 3,070,643 | A | * | 12/1962 | Toulmin, Jr. | .................. | 136/206 |
| 5,711,363 | A | * | 1/1998 | Scruggs et al. | ............... | 164/113 |
| 6,371,195 | B1 | * | 4/2002 | Onuki et al. | .................. | 164/113 |

FOREIGN PATENT DOCUMENTS

JP          2000343241 A    * 12/2000

* cited by examiner

*Primary Examiner* — Kevin P Kerns
*Assistant Examiner* — Kevin E Yon
(74) *Attorney, Agent, or Firm* — Novak Druce Connolly Bove + Quigg LLP

(57) ABSTRACT

A stainless steel-and-amorphous alloy composite includes a stainless steel part and an amorphous alloy part. The stainless steel part has nano-pores defined in a surface thereof. The amorphous alloy part is integrally bonded to the surface having the nano-pores. A method for manufacturing the composite is also described.

13 Claims, 4 Drawing Sheets

STAINLESS STEEL-AND-AMORPHOUS ALLOY COMPOSITE AND METHOD FOR MANUFACTURING

CROSS-REFERENCE TO RELATED APPLICATIONS

This application is one of the two related co-pending U.S. patent applications listed below. All listed applications have the same assignee. The disclosure of each of the listed applications is incorporated by reference into another listed application.

| Attorney Docket No. | Title | Inventors |
| --- | --- | --- |
| US 40958 | ALUMINUM-AND-AMORPHOUS ALLOY COMPOSITE AND METHOD FOR MANUFACTURING | HUANN-WU CHIANG et al. |
| US 40959 | STAINLESS STEEL-AND-AMORPHOUS ALLOY COMPOSITE AND METHOD FOR MANUFACTURING | HUANN-WU CHIANG et al. |

BACKGROUND

1. Technical Field

The present disclosure generally relates to a composite of stainless steel and amorphous alloy and a method for manufacturing the composite.

2. Description of Related Art

Due to having good properties such as high mechanical strength, high abrasion resistance, and good corrosion resistance, amorphous alloy may be joined with other metals to be used on electronic devices. Welding and adhesive bonding are two typical joining methods. However, the heat during the welding can produce a crystallization of the amorphous alloy, thus negatively affecting the welding. The adhesive bonding may only achieve a low adhesive strength of about 0.5 MPa between the amorphous alloy and the stainless steel. Moreover, restricted by the chemical durability of the adhesive material, bonded amorphous alloy and stainless steel can be only used within a narrow temperature range of about −50° C. to about 100° C., which means they are not suitable in applications where operating or environmental temperatures may fall outside the range.

Therefore, there is room for improvement within the art.

BRIEF DESCRIPTION OF THE FIGURES

Many aspects of the disclosure can be better understood with reference to the following figures. The components in the figures are not necessarily drawn to scale, the emphasis instead being placed upon clearly illustrating the principles of the disclosure. Moreover, in the drawings like reference numerals designate corresponding parts throughout the views.

DETAILED DESCRIPTION

Figure 1:
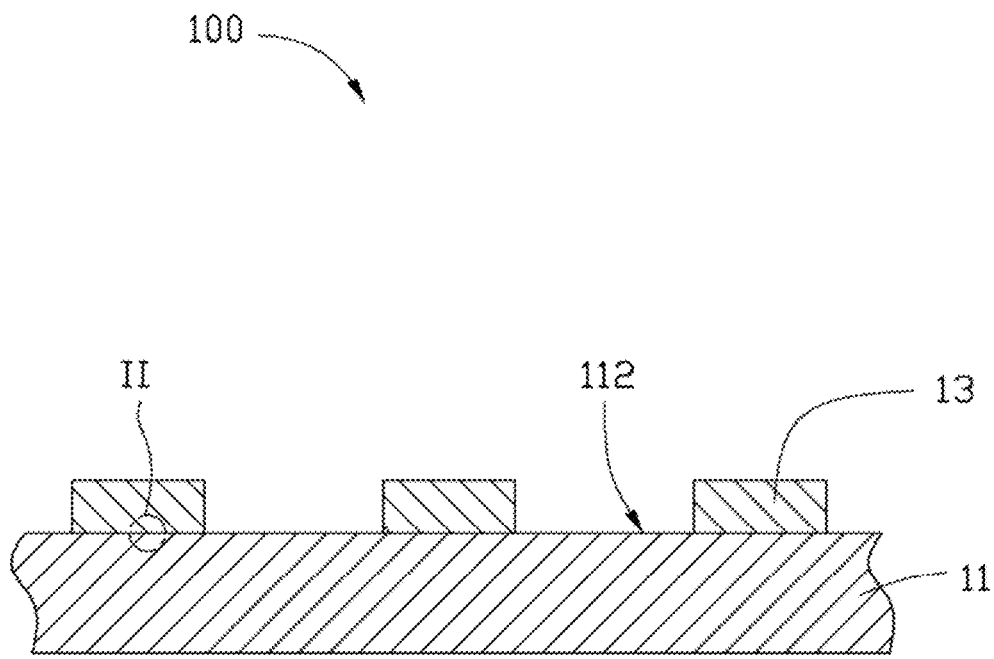
FIG. 1 is a cross-sectional view of an exemplary embodiment of a stainless steel-and-amorphous alloy composite.

FIG. 1 shows a stainless steel-and-amorphous alloy composite 100 according to an exemplary embodiment. The stainless steel-and-amorphous alloy composite 100 includes a stainless steel part 11, and amorphous alloy parts 13 integrally formed on the stainless steel part 11.

The stainless steel part 11 is made of stainless steel, which in the present disclosure refers to known corrosion-resistant ferrous alloys and which include, for instance, Cr stainless steel resulting from adding chromium (Cr) to iron, and Cr—Ni stainless steel comprising combination of nickel (Ni) and chromium (Cr).

Figure 2:
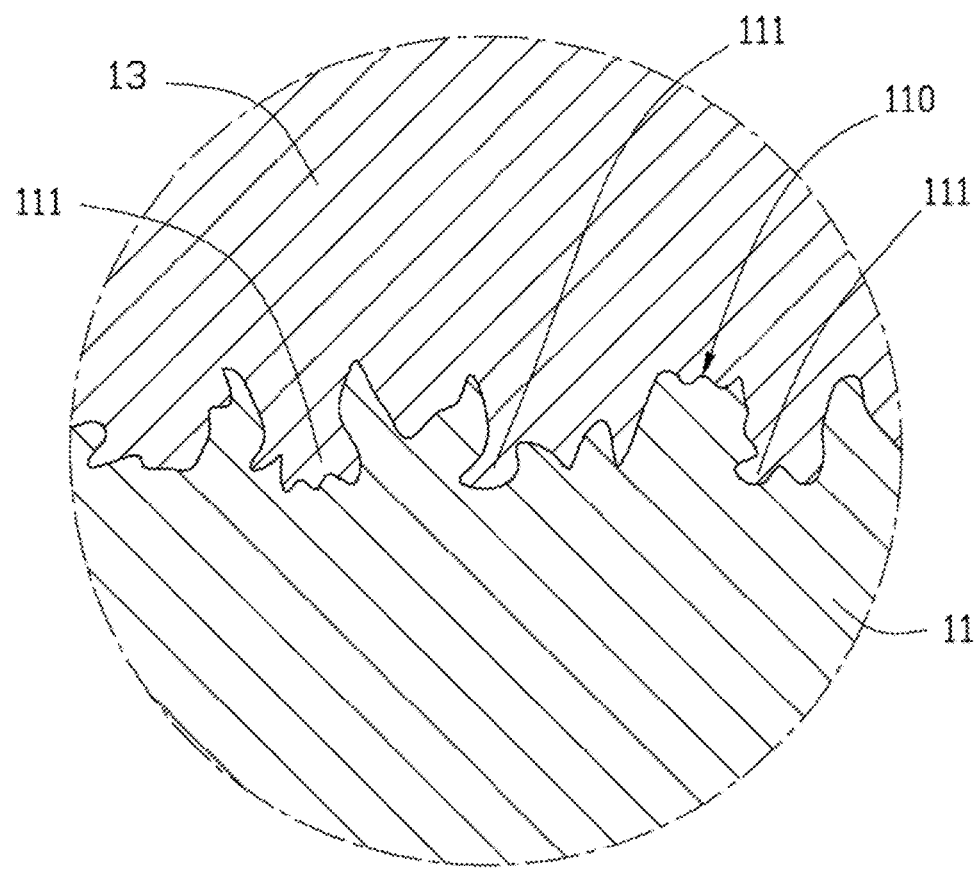
FIG. 2 is an enlarged schematic view of a circled portion II of FIG. 1.

Referring to FIG. 2, the stainless steel part 11 defines a plurality of nano-pores 111 in a surface 110 thereof. The nano-pores 111 may be uniformly formed on the surface 110 (see FIG. 3). The nano-pores 111 may have an average diameter of about 30 nanometers (nm) to about 60 nm.

The amorphous alloy parts 13 may be bonded to the stainless steel part 11 by injection molding, with portions of the amorphous alloy parts 13 penetrating in the nano-pores 111 (see FIG. 2). The amorphous alloy parts 13 may be made of an amorphous alloy selected from one of the group consisting of magnesium-based amorphous alloy, zirconium-based amorphous alloy, and copper-based amorphous alloy. The amorphous alloy for the amorphous alloy parts 13 has a supercooled liquid region (ΔT) larger than 20° C. The term "supercooled liquid region" is defined as the difference (Tx-Tg) between the onset temperature of glass transition (Tg) and the onset temperature of crystallization (Tx) of an alloy. The value of ΔT is a measure of the amorphous phase-forming ability of the alloy. The onset temperature of crystallization of the amorphous alloy is lower than 500° C.

A method for manufacturing the composite 100 may include the following steps:

The stainless steel part 11 is provided. The stainless steel part 11 may be formed by punching to obtain a desired shape.

The stainless steel part 11 may be degreased. The degreasing process may include the step of dipping the stainless steel part 11 in a degreasing agent for about 5 minutes (min) to about 15 min. The degreasing agent may be a commercial degreaser special for stainless steel or a neutral detergent in common use. The stainless steel part 11 is then rinsed in water.

The stainless steel part 11 is electrochemically etched to form the nano-pores 111. The electrochemical etching process may be carried out in an acid water solution containing about 4 wt %-7 wt % hydrochloric acid, about 10 wt %-12 wt % ferric chloride, and about 1.8 wt %-2.2 wt % ammonium chloride, with the stainless steel part 11 being an anode, and a titanium board being a cathode. An electric current density about 2 ampere per square decimeter ($A/dm^2$)-2.5 $A/dm^2$ is applied between the anode and the cathode. The acid water solution maintains a temperature of about 40° C.-60° C. during the electrochemical etching. Electrochemical etching the stainless steel part 11 may take about 8 min-14 min. Then, the stainless steel part 11 is rinsed in water and then dried.

Figure 3:
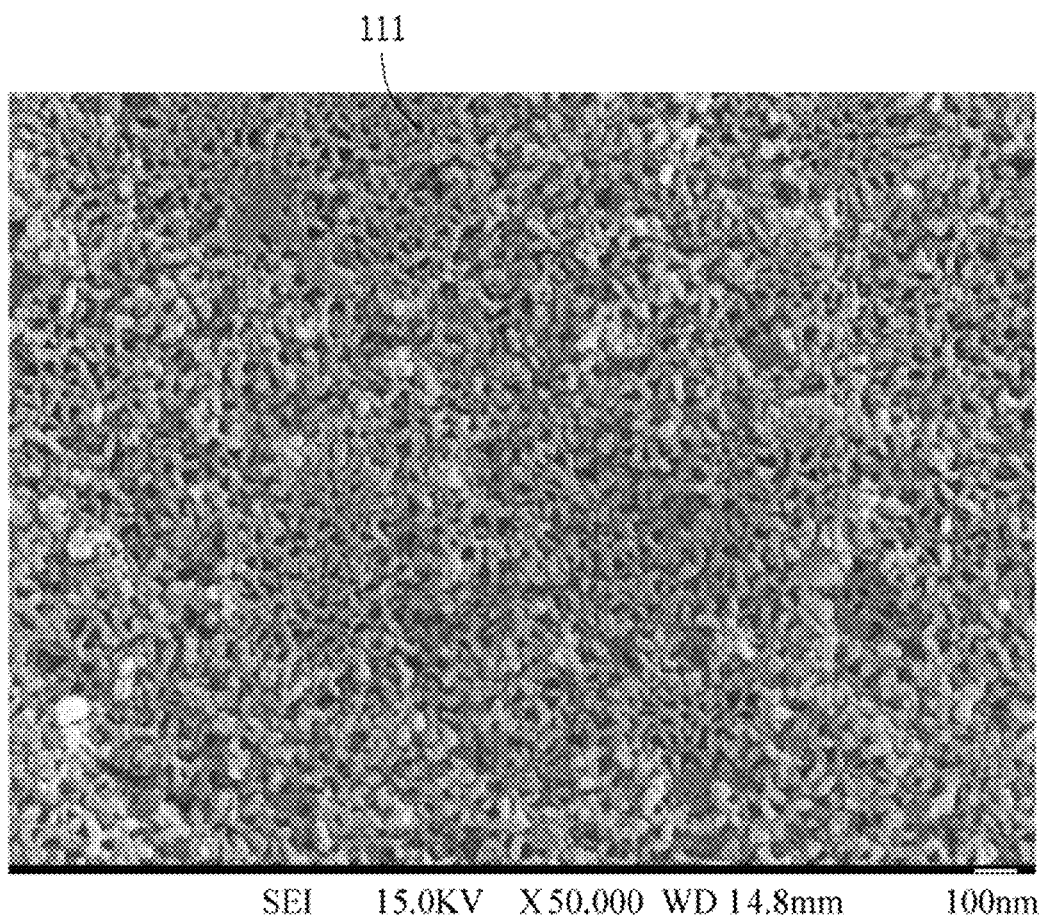
FIG. 3 is a scanning electron microscopy view of an exemplary embodiment of the electrochemically etched stainless steel part.

Referring to FIG. 3, the electrochemically etched stainless steel part 11 is observed using a field emission scanning electronic microscope, such as a JSM-6700F type microscope sold by JEOL Ltd. The observation shows that a plurality of irregular nano-pores 111 are formed on the stainless steel part 11. The nano-pores 111 have an average diameter of about 30 nm-60 nm.

The stainless steel part 11 having the nano-pores 111 is pre-heated to the onset temperature of glass transition (Tg) of the amorphous alloy for the amorphous alloy parts 13. In case of magnesium-based amorphous alloy, the Tg is about 100° C.-200° C. In case of zirconium-based amorphous alloy or copper-based amorphous alloy, the Tg is about 400° C.-500° C. The pre-heating step may help the amorphous alloy for the amorphous alloy parts 13 easily flow into the nano-pores 111 during the subsequent injection molding step. Also, the pre-heating step may further remove the water remained in the nano-pores 111, enhancing the bonding between the stainless steel part 11 and the amorphous alloy parts 13. The pre-heating step may be implemented in an oven.

Figure 4:
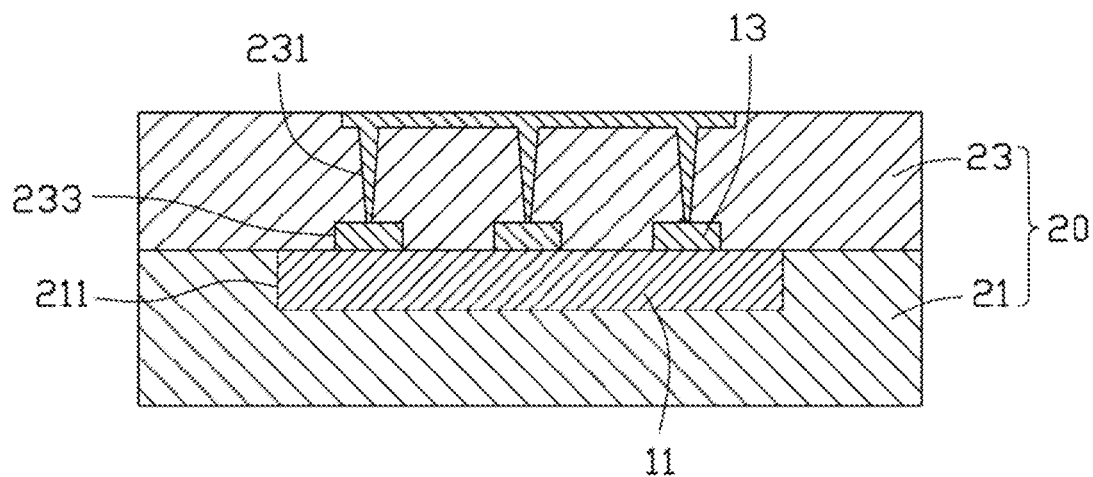
FIG. 4 is a cross-sectional view of molding the composite shown in FIG. 1.

Referring to FIG. 4, an injection mold 20 is provided. The injection mold 20 includes a core insert 23 and a cavity insert 21. The core insert 23 defines gates 231, and first cavities 233. The cavity insert 21 defines a second cavity 211 for receiving the stainless steel part 11. The pre-heated stainless steel part 11 is located in the second cavity 211. Inert gas, such as argon is fed into the injection mold 20, and molten amorphous alloy is injected through the gates 231 to coat the surface 110 of the stainless steel part 11 and fill the nano-pores 111, and finally fill the first cavities 233 to form the amorphous alloy parts 13, as such, the composite 100 is formed. The molten amorphous alloy may be at a temperature of about (Tg+5) ° C. to about (Tx-10) ° C. During the molding process, the injection mold 20 may be at a temperature of about (Tg+5) ° C. to about (Tx-5) ° C.

Amorphous alloy at a temperature between the Tg and Tx of the amorphous alloy may be very sensitive to oxidizing atmosphere and oxidized to formed a ceramic film on the surface thereof. Thus, inert gas may be fed into to the injection mold 20 as a protecting gas. The onset temperature of crystallization of the magnesium-based amorphous alloy is lower than 500° C., preventing the mechanical property of the stainless steel part 11 from damages.

Examples of manufacturing the composite 100 are described as follows. The degreasing steps in the specific examples may be substantially the same as described above so it is not described here again.

EXAMPLE 1

A stainless steel part 11 made of a SUS403 stainless steel is provided.

Electrochemically etching the stainless steel part 11: the acid water solution containing 7 wt % hydrochloric acid, 10 wt % ferric chloride, and 2.2 wt % ammonium chloride; the temperature of the acid water solution is maintained at about 40° C.; the electric current density applied is 2 A/dm$^2$; the electrochemical etching takes 8 min.

Pre-heating the stainless steel part 11: the stainless steel part 11 is pre-heated at a temperature of 157° C.

Injection amorphous alloy to form the amorphous alloy parts 13: the amorphous alloy is a magnesium-based amorphous alloy containing copper at an atomic percentage of 30%, dysprosium at an atomic percentage of 11.5%, and the remainder magnesium; the magnesium-based amorphous alloy is heated to a temperature of about 170° C. and injection molded to form the amorphous alloy parts 13.

EXAMPLE 2

Providing a stainless steel part 11 made of a SUS405 stainless steel.

Electrochemically etching the stainless steel part 11: the acid water solution containing 7 wt % hydrochloric acid, 12 wt % ferric chloride, and 2 wt % ammonium chloride; the temperature of the acid water solution is maintained at about 60° C.; the electric current density applied is 2.5 A/dm$^2$; the electrochemical etching takes 14 min.

Pre-heating the stainless steel part 11: the stainless steel part 11 is pre-heated at a temperature of 412° C.

Injection amorphous alloy to form the amorphous alloy parts 13: the amorphous alloy is a zirconium-based amorphous alloy containing copper at an atomic percentage of 30%, aluminum at an atomic percentage of 10%, nickel at an atomic percentage of 5%, and the remainder zirconium; the zirconium-based amorphous alloy is heated to a temperature of about 430° C. and injection molded to form the amorphous alloy parts 13.

EXAMPLE 3

Providing a stainless steel part 11 made of a SUS304 stainless steel.

Electrochemically etching the stainless steel part 11: the acid water solution containing 5 wt % hydrochloric acid, 10 wt % ferric chloride, and 2.1 wt % ammonium chloride; the temperature of the acid water solution is maintained at about 50° C.; the electric current density applied is 2.3 A/dm$^2$; the electrochemical etching takes 12 min.

Pre-heating the stainless steel part 11: the stainless steel part 11 is pre-heated at a temperature of 433° C.

Injection amorphous alloy to form the amorphous alloy parts 13: the amorphous alloy is a copper-based amorphous alloy containing zirconium at an atomic percentage of 30%, titanium at an atomic percentage of 10%, and the remainder copper; the copper-based amorphous alloy is heated to a temperature of about 445° C. and injection molded to form the amorphous alloy parts 13.

RESULTS

The shear strength of the composites 100 created by examples 1-3 has been tested. A universal material testing machine sold by INSTRON Ltd may be used. The tests indicate that the shear strength of the composite 100 of example 1 is about 70 MPa. The shear strength of the composite 100 of example 2 is about 110 MPa. The shear strength of the composite 100 of example 3 is about 120 MPa.

Furthermore, the composites 100 of examples 1-3 have been subjected to a temperature humidity bias test (72 hours, 85° C., relative humidity: 85%) and a thermal shock test (48 hours, −40° C. to 85° C., 4 hours/cycle, 12 cycles total), such testing did not result in decreased tensile or shear strengths of these composites 100.

It is believed that the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiment of the disclosure.

What is claimed is:

1. A method for making a stainless steel-and-amorphous alloy composite, comprising:
   providing an stainless steel part;
   electrochemically etching the stainless steel part to form nano-pores on a surface thereof;
   pre-heating the stainless steel part;
   positioning the stainless steel part in a mold; and
   molding molten amorphous alloy on the surface having the nano-pores to form an amorphous alloy part integrally bonded to the stainless steel part when hardened, the molten amorphous alloy being at a temperature of about (Tg+5)° C. to about (Tx-10)° C., wherein the Tg and Tx are the onset temperature of glass transition and the onset temperature of crystallization of the amorphous alloy respectively.

2. The method as claimed in claim 1, wherein electrochemically etching the stainless steel part is carried out in a water solution containing about 4 wt %-7 wt % hydrochloric acid, about 10 wt %-12 wt % ferric chloride, and about 1.8 wt %-2.2 wt % ammonium chloride.

3. The method as claimed in claim 2, wherein during the electrochemically etching step, an electric current density about 2 A/dm$^2$-2.5 A/dm$^2$ is applied to the stainless steel part for about 8 min-14 min; the water solution maintains a temperature of about 40° C.-60° C.

4. The method as claimed in claim 1, wherein during the pre-heating step, the stainless steel part is heated to the onset temperature of glass transition of the amorphous alloy.

5. The method as claimed in claim 1, wherein during the molding step, inert gas is fed into the mold.

6. The method as claimed in claim 1, wherein during the molding step, the mold is at a temperature of about (Tg+5)° C. to about (Tx-5)° C.

7. The method as claimed in claim 1, further comprising a step of degreasing the stainless steel part before the electrochemically etching step.

8. A method for making a stainless steel-and-amorphous alloy composite, comprising:
   providing a stainless steel part;
   electrochemically etching the stainless steel part to form nano-pores on a surface thereof, the nano-pores having an average diameter of about 30 nm-60 nm;
   pre-heating the stainless steel part;
   positioning the stainless steel part in a mold; and
   molding molten amorphous alloy on the surface having the nano-pores to form an amorphous alloy part integrally bonded to the stainless steel part when hardened, the molten amorphous alloy being at a temperature of about (Tg+5)° C. to about (Tx-10)° C., wherein the Tg and Tx are the onset temperature of glass transition and the onset temperature of crystallization of the amorphous alloy respectively, and the difference between the Tx and the Tg is larger than 20° C.

9. The method as claimed in claim 8, wherein electrochemically etching the stainless steel part is carried out in a water solution containing about 4 wt %-7 wt % hydrochloric acid, about 10 wt %-12 wt % ferric chloride, and about 1.8 wt %-2.2 wt % ammonium chloride.

10. The method as claimed in claim 9, wherein during the electrochemically etching step, an electric current density about 2 A/dm$^2$-2.5 A/dm$^2$ is applied to the stainless steel part for about 8 min-14 min; the water solution maintains a temperature of about 40° C.-60° C.

11. The method as claimed in claim 8, wherein during the pre-heating step, the stainless steel part is heated to the onset temperature of glass transition of the amorphous alloy.

12. The method as claimed in claim 8, wherein during the molding step, inert gas is fed into the mold.

13. The method as claimed in claim 8, wherein during the molding step, the mold is at a temperature of about (Tg+5)° C. to about (Tx-5)° C.

* * * * *